Nov. 6, 1951     E. L. ALLEN     2,573,679

CONTROL MECHANISM FOR DOOR LATCHES

Filed Feb. 16, 1948     5 Sheets—Sheet 1

INVENTOR.
EDWIN L. ALLEN
BY
*Bosworth & Sessions*
ATTORNEYS.

Nov. 6, 1951  E. L. ALLEN  2,573,679
CONTROL MECHANISM FOR DOOR LATCHES
Filed Feb. 16, 1948  5 Sheets-Sheet 2

INVENTOR.
EDWIN L. ALLEN
BY
Bosworth & Sessions
ATTORNEYS

Nov. 6, 1951  E. L. ALLEN  2,573,679
CONTROL MECHANISM FOR DOOR LATCHES
Filed Feb. 16, 1948  5 Sheets-Sheet 3

INVENTOR.
EDWIN L. ALLEN
BY
*Bosworth & Sessions*
ATTORNEYS

Nov. 6, 1951 E. L. ALLEN 2,573,679
CONTROL MECHANISM FOR DOOR LATCHES
Filed Feb. 16, 1948 5 Sheets-Sheet 4

INVENTOR.
EDWIN L. ALLEN
BY
ATTORNEYS.

Nov. 6, 1951  E. L. ALLEN  2,573,679
CONTROL MECHANISM FOR DOOR LATCHES
Filed Feb. 16, 1948  5 Sheets-Sheet 5

INVENTOR.
EDWIN L. ALLEN
BY
Bosworth & Sessions
ATTORNEYS.

Patented Nov. 6, 1951

2,573,679

UNITED STATES PATENT OFFICE 2,573,679

CONTROL MECHANISM FOR DOOR LATCHES

Edwin L. Allen, Cleveland Heights, Ohio, assignor, by mesne assignments, to Rudolph I. Schonitzer, Cleveland, Ohio Application February 16, 1948, Serial No. 8,565

3 Claims. (Cl. 292—226)

1

This invention relates to door latching and locking mechanisms and more particularly to certain improvements in apparatus for manually effecting release of a door latch from its latched or door closed position.

In the latching and locking of the doors of automotive vehicles or the like, it has been proposed to use latch mechanisms of various types. A very successful device for this purpose is illustrated and described in the Rudolph I. Schonitzer United States Patent No. 2,094,413, and another embodiment of the same general type of door control mechanism is illustrated and described in my copending United States patent application Serial No. 746,521, filed May 7, 1947. In the tripper type door control mechanisms illustrated in said patent and application the latching apparatus includes coacting elements associated with the door and door frame structures whereby the door may be latched and held in closed position or released from closed position to permit opening thereof, and a detent whereby one of the coacting elements, which may be termed the latch member, is releasably retained in its operative or door latched position when the door is closed. After the detent of this type of mechanism is moved by suitable manually operable means to release the latch member and permit opening of the door, the latch member is moved concurrently with the initial door opening movement into an operated or door unlatched position which is different from its above-mentioned operative or door latched position and remains in this operated position until the door is again closed. Means are also provided for locking the mechanism to prevent unauthorized opening of the door, which means effect locking of the door by blocking the detent, together with the parts of the latch mechanism proper which are directly associated with the detent for actuation thereof, against movement from latch restraining to latch released position In door control installations of the type referred to, manually operable means is provided, such as a push button or handle assembly, for effecting movement of the detent from its latch restraining to its latch released position. In the apparatus of the said Schonitzer patent and of my said copending U. S. patent application such manually operable means is also blocked against movement from its neutral or non-operating position into operating or latch releasing position when the locking means is positioned to block the detent against movement into latch released position. In some instances this arrangement is

2 considered undesirable because, if the mechanism is locked and an effort is made to open the door by operating the handle or push button, excessive force may be applied thereon with resulting damage to the latch mechanism, etc. The same difficulty may be encountered in installations of other types of door latches where locking blocks the handle against movement.

Accordingly, it is among the objects of the present invention to provide safety means for permitting the manually operable handle, push button, or the like of a door latching and locking installation to be moved by the operator in its normal path from its neutral or non-operating position to its operating or latch releasing position regardless of whether the latch mechanism, and particularly the part thereof which is directly engaged by the manually operable unit, is free to move or is locked against movement.

Other objects of my invention include: the provision of a manually operable control unit for door latches or the like whereby only a predetermined permissible maximum load may be imposed upon the latch mechanism upon operation of the manual unit, thus preventing damage to the latch unit; the provision of manually operable control means for a door latch mechanism which is effective when the latch mechanism is unlocked to cause release thereof but which, when the latch mechanism is locked, may be moved without releasing the latch mechanism; the provision of a safety handle assembly for door latches or the like which includes a yieldable safety member and is adapted to move between two extreme positions, in one of which the handle is blocked against further movement by engagement with a rigid member arranged to block the handle against further movement before the yieldable member has built up its maximum load on the latch mechanism; the provision of a safety handle assembly all moving parts of which are held under spring tension at all times, thus preventing objectionable rattles, etc.; and the provision of a compact, rugged, effective, and economical manually operable unit for controlling the operation of door latches or the like whereby the possibility of damage to the latch unit is effectively prevented.

The above and other objects of my invention will appear from the following description of several embodiments thereof, reference being had to the accompanying drawings in which.

Figure 2:
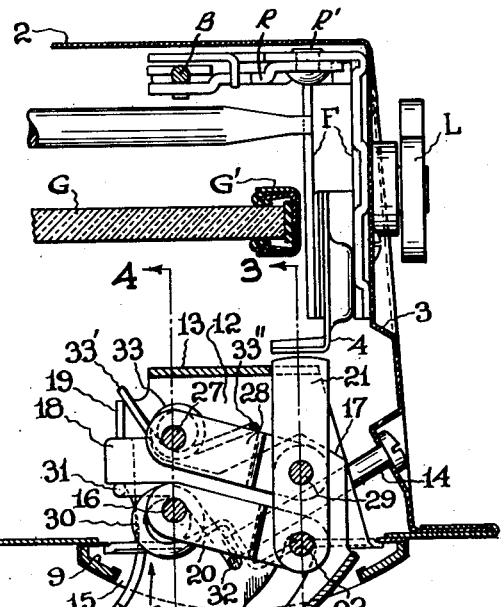
Figure 2 is a horizontal cross-sectional view taken substantially on line 2—2 of Figure 1 and illustrating the safety handle assembly together with the essential parts of the latch mechanism with which it is associated, the latch mechanism being shown in door latched position and the handle assembly being shown in neutral or non-operative position.
Figure 3:
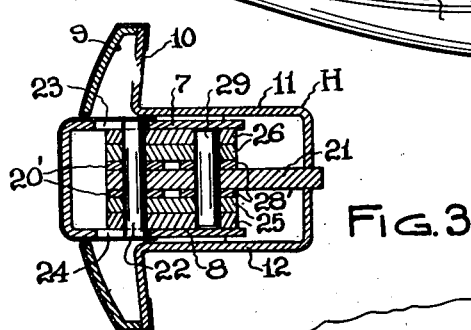
Figure 1:
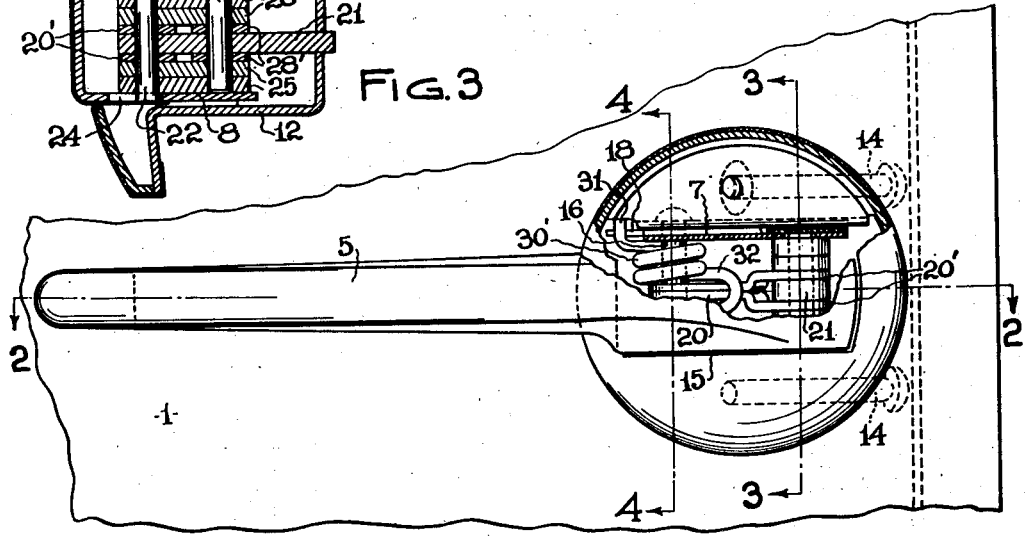
Figure 1 is a fragmentary side elevation of a portion of the outside of the door of an automotive vehicle or the like, partly in cross section, showing one embodiment of my improved safety handle assembly.

Figure 3 is a detached vertical cross-sectional view of the safety handle assembly shown in Figures 1 and 2, taken substantially on line 3—3 of Figures 1 and 2.

Figure 4:
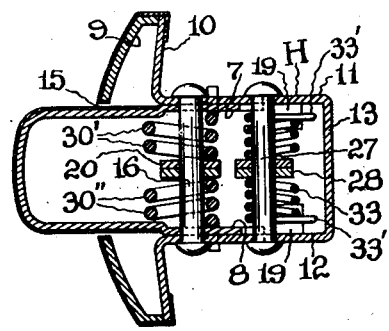

Figure 4 is a vertical cross-sectional view generally similar to Figure 3 but taken on line 4—4 of Figures 1 and 2.

Figure 5:
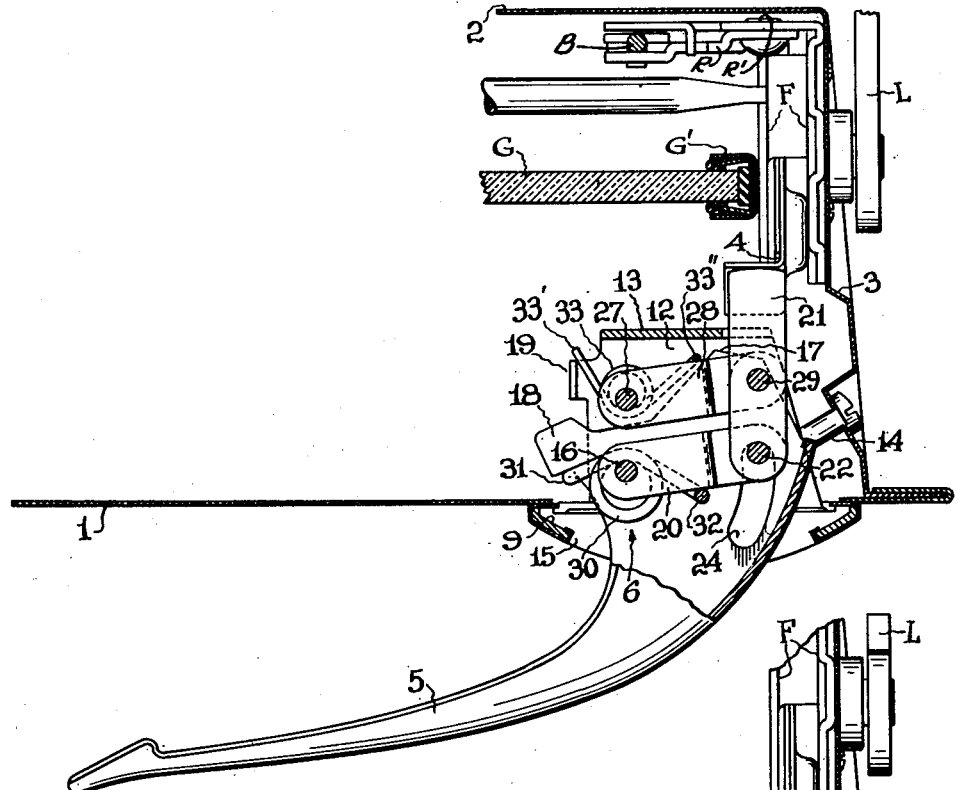

Figure 5 is a view generally similar to Figure 2 but showing the latch mechanism in unlocked, door unlatched position and the handle mechanism in operating or latch releasing position.

Figure 6:
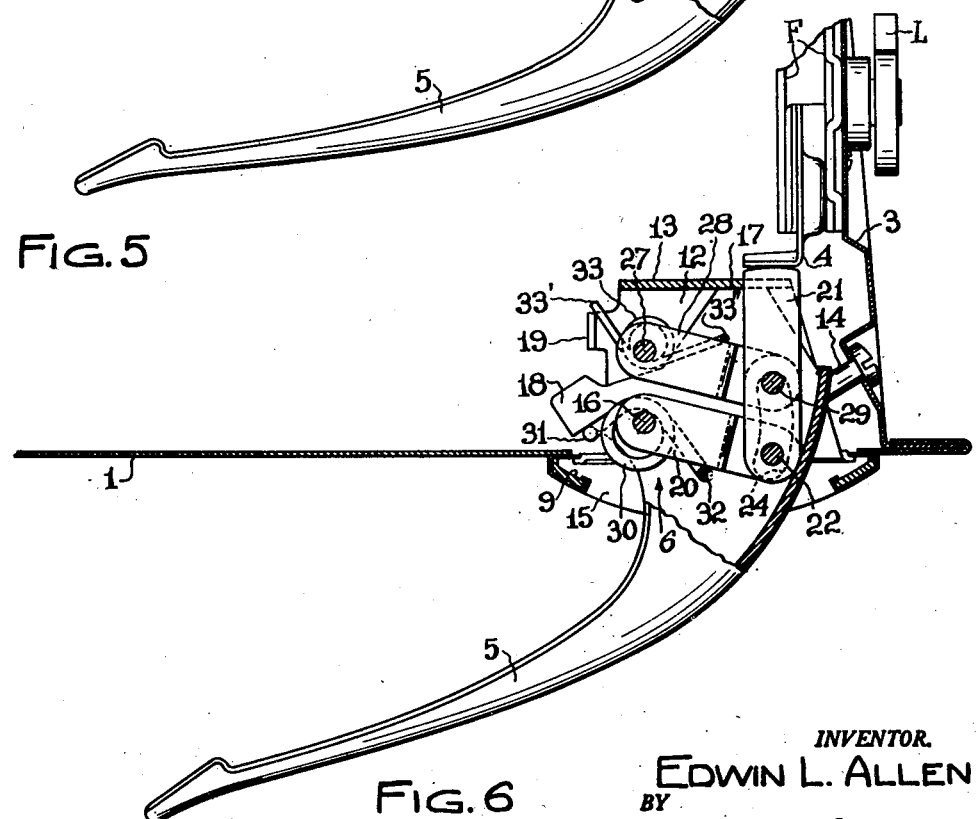

Figure 6 is a view generally similar to Figures 2 and 5 but illustrating the latch mechanism in locked, door latched position and the handle of the manual control unit in its fully extended operating or latch releasing position although the contact member of the control unit has remained substantially in its neutral or non-operating position by virtue of the safety means incorporated in the assembly.

Figure 7:
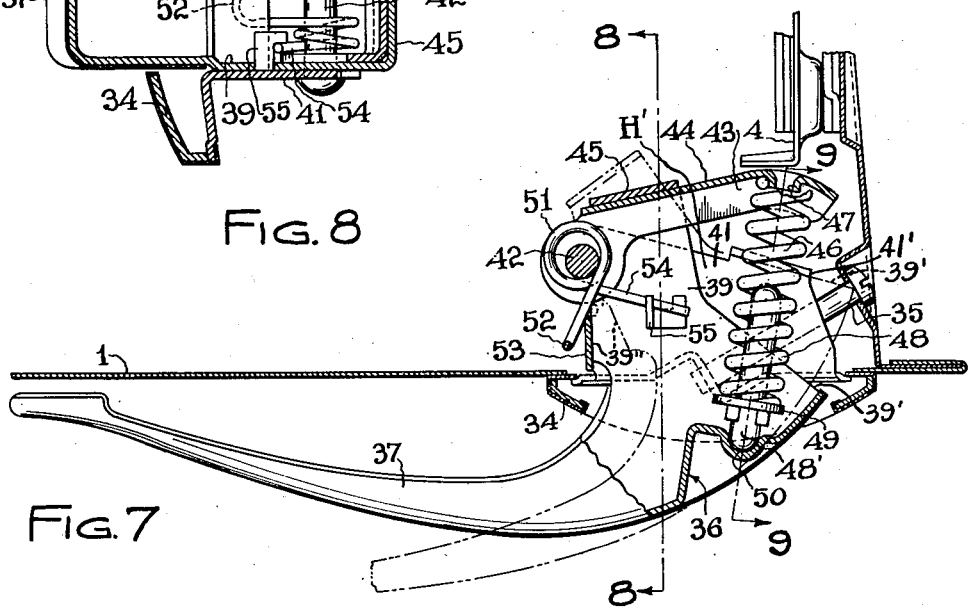

Figure 7 is a view generally similar to Figure 2 but illustrating a modified form of my invention.

Figure 8:
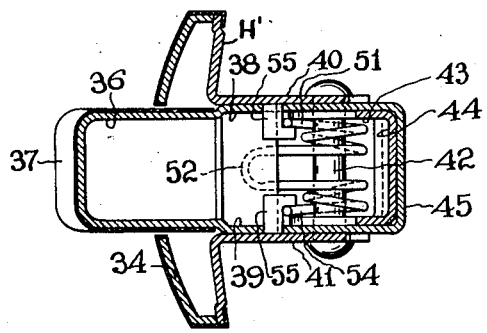

Figure 8 is a vertical cross-sectional view of the apparatus shown in Figure 7, taken substantially on line 8—8 of Figure 7.

Figure 9:
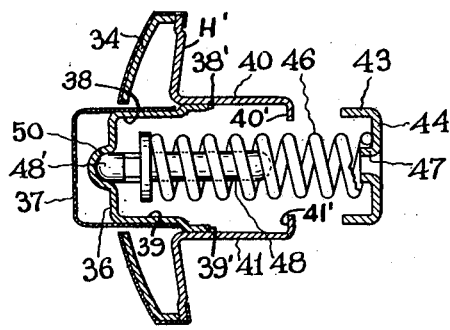

Figure 9 is a vertical cross-sectional view of the apparatus shown in Figure 7, taken substantially on line 9—9 of Figure 7.

Figure 10:
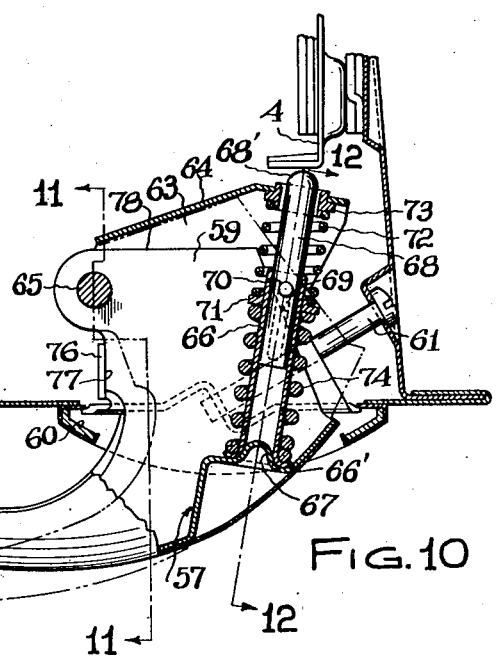

Figure 10 is a view generally similar to Figure 2 but showing another modification of my improved control mechanism for door latches or the like.

Figure 11:
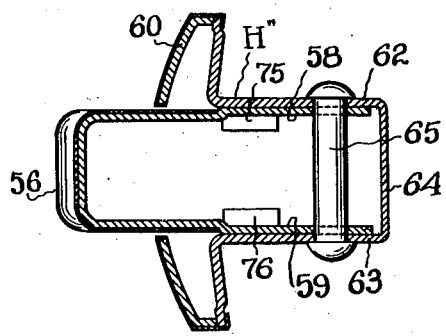

Figure 11 is a vertical cross-sectional view of the apparatus shown in Figure 10, taken substantially on line 11—11 of Figure 10.

Figure 12:
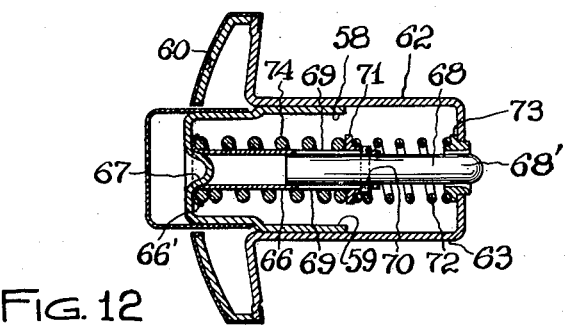

Figure 12 is a vertical cross-sectional view of the apparatus shown in Figure 10, taken substantially on line 12—12 of Figure 10.

Figure 13:
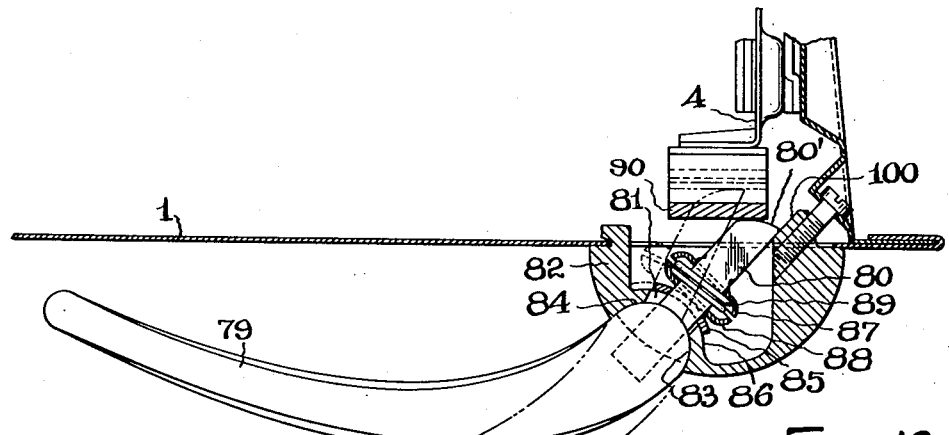
Figure 14:
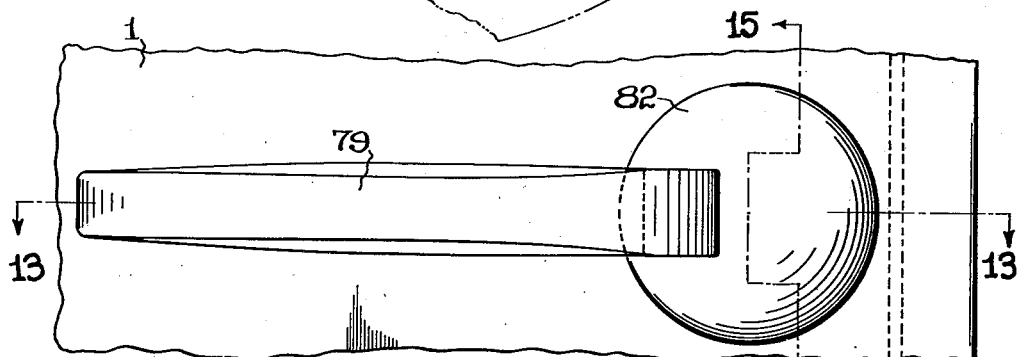

Figure 13 is a horizontal cross-sectional view taken substantially on line 13—13 of Figure 14, generally similar to Figure 2 but illustrating another modification of my invention wherein a single spring acts both as a handle return spring and a yieldable safety element.

Figure 14 is a side elevation of the apparatus shown in Figure 13.

Figure 15:
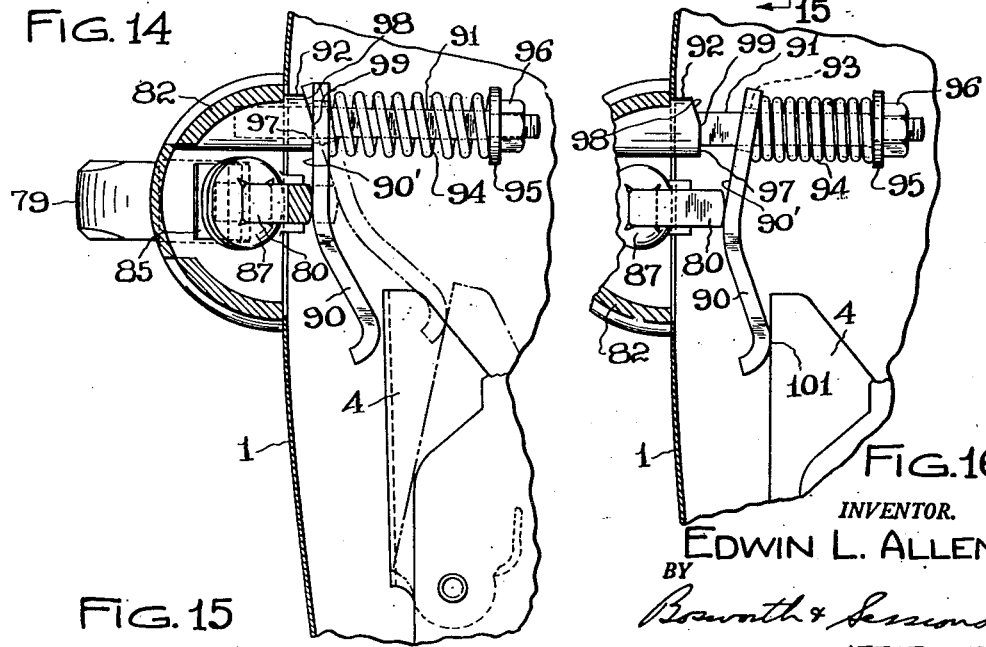

Figure 15 is a vertical cross-sectional view taken substantially on line 15—15 of Figure 14, the parts being seen in their neutral or non-operating positions.

Figure 16:
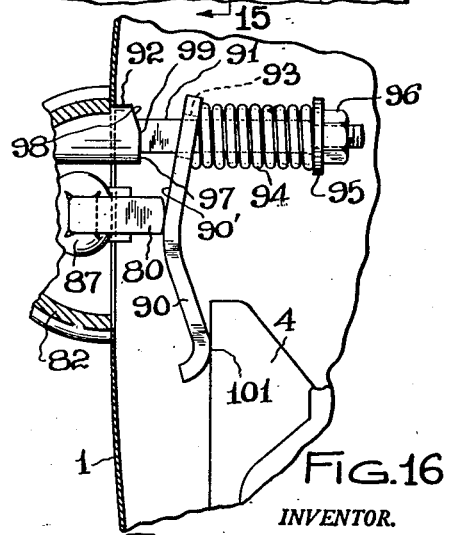

Figure 16 is a vertical cross-sectional view generally similar to Figure 15 but illustrating the parts in the positions they assume when the latch mechanism is locked and the manually operable handle or the like is moved into operating or latch releasing position.

Referring now to Figures 1 to 6, inclusive, the door with which my apparatus is associated includes an outer panel 1 and an inner panel 2 connected at the free edge of the door by a wall 3. The usual window glass is indicated at G and its glass run channel is seen at G'. It will, of course, be understood that my latch control or actuating apparatus may be employed with various types of doors and with other closure members and with various kinds of latch mechanisms. The illustrated latch mechanism is of the type described and claimed in my said copending United States patent application Serial No. 746,521 and includes a latch member L adapted to coact with a keeper pin (not shown) on the adjacent door frame. This latch mechanism also includes a frame structure generally indicated at F mounted on the inner side of the edge wall 3 and an actuating member in the form of an arm 4 suitably supported by the frame F. This actuating member is adapted to effect release of the latch member L from its door latched position when moved inwardly from the position shown in Figure 2 into that shown in Figure 5 as will be later described. Also included in the latch mechanism, but not illustrated herein as the details thereof form no part of the present invention, is a locking means for locking the latch mechanism to prevent release of the latch member L from its door latched position. For purposes of the present description it will be sufficient to point out that when the locking means is unlocked the actuating member or arm 4 may be moved between its non-operating or neutral position shown in Figure 2 and its operating or latch releasing position shown in Figure 5 while, when the locking mechanism is locked, the actuating member or arm 4 is maintained substantially in its neutral or non-operating position as seen in Figure 2. A locking rod B, shown in Figures 2 and 5, is connected to the locking member R which is pivotally supported at R'. Rod B extends upwardly therefrom through the garnish molding for operation from inside the door. When the operator desires to lock the door from the inside, he pushes rod B downwardly, which movement causes the locking member R to block movement of arm 4 in latch releasing direction. Conversely, lifting of rod B releases the arm 4 to permit movement thereof in latch releasing direction.

As illustrated in Figures 1 to 6 inclusive my improved safety handle assembly comprises a handle member 5 of any suitable form having at its inner end a bracket portion generally indicated at 6 and having horizontally inwardly extending spaced side walls 7 and 8. The supporting housing or frame structure for my handle assembly is generally indicated at H and includes a bezel supporting portion 9 disposed on the outer side of the door panel 1, a plate 10 secured to the bezel supporting portion 9 having inwardly extending spaced arms 11 and 12 connected at their inner ends by a vertical wall 13.

When assembled on a door the arms 11 and 12 extend through a suitable aperture in the door panel 1 and retaining screws 14, which extend through the edge wall 3 of the door and have threaded engagement with the housing H, are adapted to secure the housing T in position with the plate 10 clamped against the outer surface of the panel 1 and the arms 11 and 12 projecting inwardly into the interior of the door. The bezel supporting portion 9 is slotted at 15 to permit the inner end of the handle 5 to extend therethrough, sufficient clearance being provided so that the handle 5 may move freely from its neutral or non-operating position as seen in Figure 2 to its extended or operating position seen in Figures 5 and 6. The pin 16 extends across between the arms 11 and 12 of housing H and is secured thereto as by riveting its outer ends as clearly seen in Figure 4. This pin 16 passes through suitable holes in the side walls 7 and 8 of handle end bracket 6 permitting movement thereof from the position shown in Figure 2 into those shown in Figures 5 and 6. It will be noted that the side walls 7 and 8 of bracket 6 are disposed in sliding engagement with the inner surfaces of the arms 11 and 12 of housing H, thus guiding the handle in the desired path of movement and providing a substantial and rattle-proof support therefor.

The inner ends 17 of the side wall portions 7 and 8 of bracket 6 form abutments which, as is best seen in Figure 6, are adapted to engage the end wall 13 and limit the outward pivotal movement of the handle 5 and bracket 6 about the pivotal support 16. Movement of the handle 5 and end bracket 6 in the opposite (inward) direction is limited by projecting arms 18 on the side walls 7 and 8 which arms, as is clearly seen in Figure 2, engage lugs 19 extending inwardly from the arm portions 11 and 12 of housing H.

Also pivotally supported on the pin 16 is a guide arm 20 the outer end of which is bifurcated as seen at 20' (Figures 1 and 3) to accommodate the plunger or contact member 21. This plunger 21 is pivotally secured to the bifurcated end portions 20' of guide arm 20 by a pin 22 which extends outwardly into arcuate slots 23 and 24 in the top and bottom side walls 7 and 8 respectively of the bracket 6. It will be noted that the ends of pin 22 are not secured to the bracket 6 but may have movement relative thereto in the slots 23 and 24 about the common pivotal support 16 of the guide arm 20 and bracket 6. In order to center the plunger 21 between the upper and lower side walls 7 and 8 of bracket 6 spacer bars 25 and 26 are disposed between the bifurcated end portions 20' of guide arm 20 and the inner surfaces of side walls 7 and 8.

Pivotally mounted on a pin 27 which is carried by and extends between the arms 11 and 12 of housing H is a second guide arm 28 which is also bifurcated at its outer ends as seen at 28' (Figure 3) in the same manner as guide arm 20 and is pivotally secured to the plunger 21 by a pin 29. It will be apparent that the parallel guide arms 20 and 28, which are pivotally supported on the housing H and also pivotally connected to the plunger 21, will provide a support for plunger 21 guiding it for movement in a path parallel to the common center line of the pivot pins 16 and 27. As illustrated, the arms 20 and 28 are made up of identical stampings thus facilitating manufacture and assembly. It will be noted from Figure 3 that the pivot pin 29 also passes through the spacer bars or links 25 and 26 but does not extend into and is not secured to the side walls 7 and 8 of handle end bracket 6.

In order to interconnect the handle 5 and end bracket 6 thereof with the guide link 20 so that movement of handle 5 will normally cause corresponding movement of guide link 20 and plunger 21, I provide a safety spring 30 which has double coil portions 30' and 30" disposed around the pin 16 on opposite sides of the guide arm 20 (see Figure 4). The outer end portions 31 of spring 30 engage the arms 18 of the side walls 7 and 8 while the inner ends of the coil portions of spring 30, which are connected together in the form of a loop 32, engage the outer edge of the guide arm 20. As the spring 30 is preloaded when installed, the ends 31 are held stationary relative to the bracket 6 by the arms 18 while the end 32 urges the arm 20 in counterclockwise direction (Figure 2) relative to the bracket 6 and thus normally maintains the outer ends of the pin 22 in engagement with the inner ends of the slots 23 and 24 as seen in Figures 2 and 3.

In order to return the handle 5 to its neutral position (Figure 2) after it has been moved outwardly away from the door panel 1 into the latch releasing position of Figure 5, I provide a return spring 33 which may be generally similar in form to spring 30 but of considerably less strength. This spring has end portions 33' abutting the lugs 19 of the housing H and its other end portion 33" engaging the second guide arm 28 and tending to urge same in clockwise direction relative to the housing H (Figure 2).

Figures 1 to 4 inclusive illustrate the parts of my apparatus in their door closed and latched positions, the outside door handle 5 being in neutral or non-operating position. If it is desired to release the latch mechanism to permit opening of the door, assuming that the latch mechanism is not locked and that the actuating member or arm 4 of the latch mechanism is free to move inwardly in latch releasing direction, the operator will grip the handle 5 and pull outwardly thereon. This action will cause the handle 5 and its end bracket portion 6 to move about the pivotal support 16 in counterclockwise direction as seen in Figure 2. The arms 18 of bracket 6 will also move in counterclockwise direction around pivot 16 and will cause the safety spring 30 to rotate about the pin 16, the end portion 32 engaging the guide arm 20 and causing corresponding rotation of arm 20 about pin 16. This concurrent movement of the handle 5 and bracket 6 with the guide arm 20 causes the plunger or contact member 21 to be moved inwardly relative to the housing H and to bear against the end of arm 4 causing same to be moved inwardly to release the latch mechanism. As previously noted, this movement of the plunger 21 is in a path parallel to the common center line of pins 16 and 27 due to the action of the second guide arm or link 28.

In order that the handle mechanism will operate as described above to release the latch it is necessary that the spring 30 be of such strength or stiffness, or be preloaded to such a degree, that the resistance imposed against the plunger 21 by the arm 4 in its normal latch releasing movement is insufficient to cause material flexing or compression of spring 30. In order to secure the desired firm and positive unlatching action of the handles, the spring 30 is preferably preloaded when installed to such a degree that it will not be appreciably flexed by the force imposed thereon through plunger 21 during release of the unlocked latch mechanism.

Figure 5 illustrates the positions the parts assume when the handle has reached its operating or latch releasing position and it will be noted that, during movement of the second guide arm 28 from the position of Figure 2 into that of Figure 5, the return spring 33 has been compressed and energized. When the operator releases the handle 5 the energy stored in spring 33, acting through the guide arm 28, plunger 21, guide arm 20, safety spring 30, and bracket 6, will return the handle 5 to its neutral position as seen in Figure 2. Thus when the latch mechanism is unlocked the handle unit operates as an integral assembly which is movable into latch releasing position against the relatively light resistance of the return spring 33 and is returned to neutral position by the spring 33 when released by the operator. Return spring 33 is also preferably installed in somewhat preloaded condition and thus all moving parts of the latch control mechanism are at all times under spring tension and objectionable vibrations and rattles are effectively prevented.

If the latch mechanism is locked to prevent unauthorized opening of the door the actuating member or arm 4 will be blocked against movement between its non-operating or neutral position (Figure 2) and its operating or latch releasing position (Figure 5). If an attempt is now made to open the door by pulling outwardly on the handle 5 the result will be that the handle 5 may be moved outwardly into the position shown in Figure 6 but the plunger 21 and the guide arms 20 and 28 will not move substantially from their positions as seen in Figure 2 (see Figure 6). Thus the handle 5 may be idled through the same path that it takes in its operating movement. During the idling movement of the handle the safety spring 30 is wound up or loaded, the end portion 32 thereof remaining substantially stationary while the ends 31 are rotated, by engagement of the arms 18, about the pivot pin 16. Under the circumstances just described the safety spring 30 also acts as a return spring to move the handle back into the position in Figure 2 when it is released from the position seen in Figure 6.

It will be noted that in Figure 6 the handle has been moved outwardly to the limit of its permitted movement, the abutment 17 on the bracket portion 6 having reached and engaged the vertical wall 13 of the housing H. The spring 30 is so designed and installed that, when the latch mechanism is locked, the maximum load which can be imposed on the latch mechanism through the spring 30 and the plunger 21, which occurs when handle 5 reaches its fully extended position seen in Figure 6, is insufficient to cause any damage to or overloading of the latch mechanism through the arm 4. After the handle 5 reaches its fully extended position as seen in Figure 6 any additional outward pull thereon will be absorbed by the housing H, which is in effect a part of the door structure, and will not be transmitted to the latch mechanism. Thus my improved safety handle construction provides means for effectively protecting the latch mechanism against damage due to attempts to move the handle, or other manually operable member, when the latch mechanism is locked. It will be understood that the safety spring 30 will be designed to provide the desired action and to insure operation of the latch when unlocked but will not be so strong as to impose an undesirably great resistance to movement of the handle 5 when the latch mechanism is locked.

In Figures 7, 8, and 9 I have illustrated a modified form of safety handle mechanism incorporated in a door having an outer panel 1 and associated with a latch having an actuating member on arm 4. The function and mode of operation of the arm 4 is the same as that previously described. As seen in full lines in Figure 7 the handle assembly and the arm 4 are in their neutral positions. The mounting of the handle assembly in this embodiment is similar to that previously described, the bezel supporting portion 34 carrying the housing H' which is secured to the door structure by screws 35. The handle end bracket portion is generally indicated at 36 and the handle proper at 37. Bracket 36 is formed with spaced parallel side walls 38 and 39 which, as seen in Figure 8, fit within the inwardly projecting plate portions 40 and 41 of housing H'. The plate portions 40 and 41 have their innermost ends turned toward each other to form abutments 40' and 41', see Figure 9, which coact with the inner edges 38' and 39' of walls 38 and 39 of the bracket 36 to limit latch releasing movement of handle 37 and bracket 36. As shown in phantom lines in Figure 7, the stop portion 39' of wall 39 engages abutment 41' to limit movement of handle 37 and bracket 36 in latch releasing direction. A pivotal support for the handle 37 and bracket 36 is provided by a pin 42 extending between and carried by the plate portions 40 and 41 of housing H'. Also pivotally mounted on the pin 42 is an arm or lever member 43 which, as is seen in Figure 8, is of generally channel shaped cross section having a web portion 44 adapted to engage the end wall 45 of bracket 36. In this embodiment of my invention the safety spring is a preloaded coil spring 46 supported at its inner end by a boss 47 on the lever 42 and at its outer end by a guide pin 48 which has a flange portion 49 against which the outer end of spring 46 abuts. In order to accommodate for angular movement of the parts, as will later appear, the outer end 48' of guide pin 48 is of generally hemispherical form and is seated in a corresponding cup or recess 50 in the bracket 36.

Return of the handle 37 from its extended or operating position to its neutral position, when the latch mechanism is unlocked and the arm 4 is free to move, is effected by the return spring 51 which is disposed around the pivot pin 42 and has its end portion 52 engaging a web 53 of housing H' and its other ends 54 engaging lugs 55 which are struck inwardly from the side walls 38 and 39 of bracket 36. Web 53 is also an abutment which coacts with stop portion 39'' of side wall 39 of bracket 36 to stop the handle 37 at its neutral position. In Figure 7, handle 37 and bracket 36 are shown in their neutral or non-operating positions, the stop portion 39'' being in engagement with the abutment or web 53. The action of return spring 51 is such that, when the handle 37 and bracket 36 are moved in counterclockwise direction from the position shown in Figure 7, the spring 51 is loaded and the energy stored in the spring is effective to return the bracket and handle to their normal positions when released by the operator.

The operation of the apparatus of Figures 7, 8, and 9 will now be described. If the parts are in their neutral positions and the latch mechanism is unlocked, outward movement of the handle 37 (counterclockwise about the pivot pin 42 as seen in Figure 7) will cause the lever 43 to rotate about the pivot 42 and, through its engagement with the arm 4, cause inward movement of arm 4 to release the latch mechanism. During this operation the safety spring 46 is not substantially compressed and the handle 37, bracket 36, pin 48, spring 46 and lever 44 move as a unit. When the handle is released after this operation these parts are returned as a unit to their neutral positions by the return spring 51.

If, however, the latch mechanism is locked and the arm 4 is fixed against movement from the position seen in Figure 7, outward movement of the handle 37 will result in corresponding movement of the bracket 36 into the phantom line position shown in Figure 7. During this movement of handle 37 and bracket 36 the lever 43 remains substantially stationary because of its engagement with the fixed arm 4. The safety spring 46 will be compressed and the ball and socket engagement of the pin 48 in the bracket 36 will permit the pin and spring to assume the necessary angular position to prevent binding. Upon release of the handle after such an idling operation both the safety spring 46 and return spring 41 will serve to move the handle back to its neutral position. Thus this embodiment of my invention achieves substantially the same results as those obtained by the form shown in Figures 1 to 6 and the spring 46 is designed so that, when the latch mechanism is unlocked, it will serve to hold the web 44 of lever 43 in engagement with the end wall 45 of bracket 36. By installing the spring 46 in preloaded condition sufficient force is exerted thereby to prevent relative movement of the lever 43 and bracket 36 during normal operation of the handle unit when the latch is unlocked while permitting the handle to move, when the latch is locked, without building up excessive or dangerous loads on the latch mechanism.

In Figures 10, 11, and 12 a third embodiment of my safety handle apparatus is illustrated. In this form of the invention the handle 56 carries an end bracket member, generally indicated at 57, having side wall portions 58 and 59 projecting inwardly in parallel relation through the opening in the body panel 1 into the housing H'' which is carried by the bezel supporting portion 60 and held in position on the door by screws 61. As is best seen in Figure 11, the housing H'' includes side plate portions 62 and 63 and an end wall portion 64. In order pivotally to support the handle 56 and bracket 57 a pin 65 extends through the walls 62 and 63 of housing H'' and is retained in position as by riveting its ends as indicated in Figure 11. The side walls 58 and 59 of bracket 57 are suitably apertured to receive pin 65 which forms an axis of rotation for handle 56 and bracket 57.

A tubular guide sleeve 66 has its outer end portion flared as seen at 66' and is supported on the bracket 57 by a generally hemispherical projection or boss 67. Carried by the sleeve 66 for sliding movement therein is a plunger member 68. Slots 69 in sleeve 66 accommodate a transversely extending pin 70 which extends through the plunger 68 into the slots 69 to limit the sliding movement of the plunger in the sleeve. A flange or spring abutment member 71 has a sliding fit on the sleeve 66 adjacent its inner end and a return spring 72 is disposed around the plunger 68 and abuts flange 71 at its outer end and a sleeve 73 at its inner end. This sleeve member 73 is supported in the end wall 64 of housing H'' and is apertured to permit plunger 68 to move freely therethrough. The safety spring 74 is carried by the sleeve 66 and engages the flared end portion 66' thereof at its outer end and flange 71 at its inner end.

Abutments 75 and 76 are bent inwardly from the side plates 62 and 63 of housing H'' (see Figures 10 and 11) and coact with stop portions 77 on the side walls 58 and 59 of bracket 57 to limit movement of handle 56 toward the door panel 1. In Figure 10 the handle 56 and bracket 57 are shown in their neutral or non-operating positions, the stops 77 being in engagement with the abutments 75 and 76. Movement of the handle 56 and bracket 57 in operating direction is limited by engagement of the inner edges 78 of side walls 58 and 59 of bracket 57 with the end wall 64 of housing H''. This limiting engagement is seen in Figure 10 in the dot and dash line position of bracket 57. Operating engagement of the contact member or plunger 68 with the actuating member or arm 4 of the latch mechanism is made by the rounded inner end 68' of plunger 68 (see Figure 10) and the operation of the apparatus shown in Figures 10, 11 and 12 is as follows.

Assuming that the latch mechanism is unlocked and the actuating member or arm 4 is free to move from its non-operating or neutral position seen in Figure 10 into its operating or latch releasing position as has been previously described, when the operator pulls outwardly on handle 56 the bracket 57 is rotated in counter-clockwise direction (Figure 10) about its pivotal support 65. This movement causes the sleeve 66 and spring 74 to move inwardly carrying therewith the flange 71 and pin 70 against which flange 71 normally abuts as seen in Figure 12. As pin 70 is carried by plunger 68 corresponding inward movement is imparted to plunger 68 and transmitted to the arm 4 to effect latch releasing movement thereof. During this movement of plunger 68 and flange 71 the return spring 72 is compressed. However the safety spring 74, which is preferably preloaded when installed, is not substantially compressed because its resistance to compression is greater than the force required to move the arm 4 into latch releasing position. Thus, when the latch mechanism is unlocked, the handle 56, bracket 57, sleeve 66, and plunger 68 move as a unit, the plunger 68 being guided by the fixed sleeve 73 on the housing H'' and limited angular movement of the plunger and sleeve assembly being permitted by the ball and socket connection between the end 66' of plunger 66 and the boss 67 on bracket 57. When the operator releases the handle the return spring 72, acting upon the bracket 57 through the flange 71, relatively stiff spring 74, and the outer end portion 66' of sleeve 66, moves the bracket 57 and arm 56 back into neutral or non-operating position as seen in full lines in Figure 10.

If the latch actuating member or arm 4 is locked against movement and the operator pulls outwardly on the handle 56 the plunger 68 will not move inwardly as it will be prevented from doing so by the arm 4. The flange 71 is also held against inward movement by its engagement with the pin 70 in the plunger 68. However the sleeve 66 may move inwardly over the plunger 68 due to the slots 69 and during such movement of sleeve 66 the safety spring 74 will be compressed. Thus the handle 56 may be idled even though the latch mechanism is locked and the maximum force which can be transmitted by the plunger 68 against the arm 4 is that which is built up by compression of the safety spring 74. This spring is designed so that the maximum possible pressure of the plunger 68 against arm 4 will be substantially less than the load which can be safely taken by the latch mechanism and thus idling movement of the handle 56 cannot result in damage to the latch. When handle 56 reaches its fully extended position with the edge 78 of bracket 57 in engagement with the end wall 64 of housing H'', as seen in phantom lines in Figure 10, any further pull on the handle will be absorbed by the housing H'' and the door structure and thus under no circumstances can the latch mechanism be injured by forces exerted on the handle 56.

Another embodiment of my safety handle mechanism is illustrated in Figures 13 to 16 inclusive. In this form of my invention the handle 79 has an operating bar or lever 80 extending inwardly at its inner end through an aperture 81 in the bezel or supporting frame member 82. The generally hemispherical inner end portion 83 of handle 79 fits into a corresponding recess 84 in the bezel 82 and a curved washer 85 is slidably mounted on the square bar or lever 80 for engagement with the correspondingly curved inner surface 86 of bezel 82. To maintain washer 85 in frictional sliding engagement with surface 86 a flange 87 is crimped upon or otherwise rigidly secured to the bar 80. A corresponding flange or washer 88 is slidingly mounted on bar 80 in engagement with the outer surface of curved washer 85. Between the washers 87 and 88 is a compression spring 89 which holds the sliding washer 88 against curved washer 85 thus maintaining frictional engagement of washer 85 with the surface 86 of bezel 82 and permitting the handle 79 to have pivotal movement about the vertical center line of the spherical end portion 84 thereof. Such movement of handle 79 may only be in a plane substantially normal to the outer door panel 1 as the recess 81 in bezel 82 has top and bottom edge walls which engage the top and bottom faces of the rectangular bar or lever 80.

In this embodiment of my invention the contact member which engages the actuating member or arm 4 of the latch mechanism comprises a lever 90 which is supported at one end on a pin 91, of square cross section, which projects into and is rigidly supported by the inward projection 92 of bezel 82. The lever 90, as is best seen in Figures 15 and 16, is apertured at 93 to accommodate the pin 91 and the cross section of this aperture 93 is sufficiently larger than the cross section of pin 91 to permit limited swinging movement of lever 90 axially of pin 91 as will be later described. Substantial rotational movement of lever 90 about the axis of pin 91 is prevented by the square cross section of pin 91 and the correspondingly shaped aperture 93 in lever 90.

Supported by the pin 91 and disposed therearound is a combination safety and return spring 94. As seen in Figures 15 and 16, the outer end of this spring 94 abuts the inner face of lever 90 and its inner end abuts a washer 95 which is held in position on the pin 91 as by a nut 96 on the threaded outer end of pin 91. This spring 94 is installed in preloaded or compressed condition and when the parts are in their neutral or non-operating positions (see in full lines in Figures 13 and 15) it maintains the outer surface 90' of lever 90 in engagement with the lower half 97 of the end of the projection 92 on bezel 82. As is clearly seen in Figures 15 and 16 this lower half 97 of the end of projection 92 extends at right angles to the axis of pin or rod 91. The upper half 98 of the inner end of projection 92 is beveled or relieved toward the door side panel 1 and the junction 99 of the surfaces 97 and 98 forms a pivot or fulcrum about which the lever 90 may have limited inward swinging movement.

As is best seen in Figure 13 the inner end of bar or lever 80 is rounded at 80' and engages the outer surface of lever 90. In operating the apparatus just described, when the latch mechanism is unlocked and the arm 4 is free to move inwardly into latch releasing position, outward movement of the handle 79 will cause corresponding inward movement of the bar 80 and the engagement of the inner end portion 80' thereof with lever 90 will swing lever 90 in counterclockwise direction (Figure 15) about the pivot point 99 into the phantom line position shown in Figure 15. This pivotal or rotational movement of lever 90 will occur because the force exerted by the preferably preloaded spring 94 against the inner face of lever 90 is sufficient to hold it against the end of fixed projection 92. Upon releasing the handle 79 under these conditions the spring 94 will straighten out the lever 90 and move it back into its neutral position as seen in full lines in Figure 15 and this movement will be transmitted through the bar 80 to the handle 79 causing it to return to its neutral position as seen in Figure 13. One side of the inner end of bar 80 engages an abutment 100 on the bezel 82 to limit the return movement of handle 79 and also outward swinging movement of lever 90 while engagement of the opposite side of bar 80 with the edge of aperture 81 (as seen in phantom lines in Figure 13) limits outward movement of handle 79.

When the latch mechanism is locked and the actuating member or arm 4 is blocked against inward movement and the handle 79 is pulled outwardly, the corresponding inward movement of bar 80 will cause the lever 90 to swing inwardly about the point of engagement 101 between the lever 90 and arm 4 and will compress the spring 94 as shown in Figure 16. From the above description it will be seen that when the latch mechanism is unlocked the handle 79 and bar 80 may be moved to effect swinging movement of the contact member or lever 90 about the pivot point 99 formed by the junction of the end surfaces 97 and 98 of projection 92 while, when the arm 4 is blocked against inward movement, movement of the handle 79 into its extended position will cause lever 90 to be pivoted about its opposite end at 101 and the safety spring 94 to be compressed. The limit of outward movement of the handle 79 is reached when bar 80 engages the end of slot 8 and outward force applied to the handle after reaching this position will be taken by the bezel 82 and the door structure. The parts are so proportioned that this position of bar 80 is reached before spring 94 reaches its maximum yielding or fully compressed condition (see Figure 16) and thus it is impossible by movement of handle 79 to exert a greater load on the locked latch mechanism than can be transmitted through the resilient spring 94. In either idling or operating conditions the compression of spring 94 is effective to return the lever 90, bar 80, and handle 79 to their neutral or non-operating positions. Thus spring 94 acts both to return the handle 79 to neutral position (Figure 13) and to serve as a safety spring to permit idling movement of the handle 79 and to prevent excessive force from being applied when the latch mechanism is locked.

It will be noted that in all of the illustrated embodiments of my invention the movement of the manually operable handle or the like in latch releasing direction is limited by a fixed stop on the frame or housing which is located to be effective to limit releasing movement of the handle before the safety spring reaches its maximum yielding position (the position in which it acts as a solid member rather than as a resilient spring member). As noted above this makes it impossible to overload the latch mechanism.

Although I have described in considerable detail several embodiments of my improved safety handle control mechanism for door latches or the like it will be understood that variations and modifications may be made in the arrangement and proportions of the parts which make up my improved apparatus. Accordingly I do not wish to be limited to the specific forms herein shown and described but claim as my invention all embodiments thereof coming within the scope of the appended claims.

I claim:

1. Control mechanism for door latches including a supporting frame structure, a manually operable handle pivotally supported on said frame structure for movement between a neutral or non-operating position and an operating or latch releasing position and having an inner end bracket portion, a lever pivotally mounted at one end on said supporting frame for movement about the same axis as said handle and end bracket, said lever extending from said axis in the opposite direction from said handle and having its other end disposed outside of said handle and end bracket portion thereof, stop means on said end bracket portion disposed to engage said lever between its said ends and adapted to limit movement of said lever about its pivotal support in one direction relative to said end bracket portion, a guide pin having one end pivotally engaging said end bracket portion, an abutment flange on said guide pin, a coil spring surrounding said guide pin and extending between said abutment flange and said other end of said lever member, said coil spring being under compression and tending to maintain said guide pin in engagement with said end bracket portion and said lever in engagement with said stop means, and independent return spring means for urging said handle and end bracket portion thereof toward neutral or non-operating position.

2. Control mechanism for door latches including a supporting frame structure, a manually operable handle pivotally supported on said frame structure for movement between a neutral or non-operating position and an operating or latch releasing position and having an inner end bracket portion, a lever pivotally mounted at one end on said supporting frame, said lever extending in the opposite direction from said handle and having its other end disposed outside of said handle and end bracket portion thereof, stop means on said end bracket portion disposed to engage said lever between its said ends and adapted to limit movement of said lever about its pivotal support in one direction relative to said end bracket portion, a guide pin having one end pivotally engaging said end bracket portion, an abutment flange on said guide pin, a coil spring surrounding said guide pin and extending between said abutment flange and said other end of said lever member, said coil spring being under compression and tending to maintain said guide pin in engagement with said end bracket portion and said lever in engagement with said stop means.

3. Control mechanism for door latches including a supporting frame structure, a manually operable handle pivotally supported on said frame structure for movement between a neutral or non-operating position and an operating or latch releasing position and having an inner end bracket portion, a lever pivotally mounted at one end on said supporting frame for movement about the same axis as said handle and end bracket, said lever extending from said axis in the opposite direction from said handle and having its other end disposed outside of said handle and end bracket portion thereof, means on said end bracket portion for limiting movement of said lever about its pivotal support in one direction relative to said end bracket portion, a guide pin having one end pivotally engaging said end bracket portion, an abutment flange on said guide pin, a coil spring surrounding said guide pin and extending between said abutment flange and said other end of said lever member, said coil spring being preloaded and adapted to urge said handle and lever in opposite directions about their pivotal support on said frame, and independent return spring means for urging said handle and end bracket portion thereof toward neutral or non-operating position.

EDWIN L. ALLEN.

REFERENCES CITED

The following references are of record in the file of this patent:

UNITED STATES PATENTS

| Number | Name | Date |
|---|---|---|
| 1,138,875 | Landsiedel | May 11, 1915 |
| 2,034,746 | Ciak et al. | Mar. 24, 1936 |
| 2,115,849 | Gustavson | May 3, 1938 |
| 2,228,674 | Raymond | Jan. 14, 1941 |
| 2,252,591 | Anderson | Aug. 12, 1941 |
| 2,259,670 | Van Voorhees | Oct. 21, 1941 |
| 2,382,062 | Joachim | Aug. 14, 1945 |